United States Patent
Zacharias

(10) Patent No.: US 8,852,437 B2
(45) Date of Patent: Oct. 7, 2014

(54) METHOD AND PRODUCTION PLANT FOR PRODUCING STERILE WATER

(75) Inventor: Jörg Zacharias, Koefering (DE)

(73) Assignee: Krones AG, Neutraubling (DE)

( * ) Notice: Subject to any disclaimer, the term of this patent is extended or adjusted under 35 U.S.C. 154(b) by 418 days.

(21) Appl. No.: 13/249,556

(22) Filed: Sep. 30, 2011

(65) Prior Publication Data

US 2012/0080379 A1 Apr. 5, 2012

(30) Foreign Application Priority Data

Sep. 30, 2010 (DE) .......................... 10 2010 041 827

(51) Int. Cl.
| | |
|---|---|
| *B01D 61/14* | (2006.01) |
| *B01D 61/22* | (2006.01) |
| *C02F 1/72* | (2006.01) |
| *C02F 1/76* | (2006.01) |
| *C02F 1/78* | (2006.01) |
| *A23L 3/00* | (2006.01) |
| *B01D 65/10* | (2006.01) |
| *C02F 1/00* | (2006.01) |
| *C02F 1/44* | (2006.01) |
| *A23L 3/3409* | (2006.01) |
| *C02F 103/02* | (2006.01) |

(52) U.S. Cl.
CPC . *C02F 1/008* (2013.01); *C02F 1/76* (2013.01); *A23L 3/003* (2013.01); *C02F 2303/04* (2013.01); *B01D 65/104* (2013.01); *C02F 1/444* (2013.01); *C02F 1/722* (2013.01); *C02F 2209/23* (2013.01); *B01D 2311/04* (2013.01); *B01D 61/22* (2013.01); *B01D 61/145* (2013.01); *C02F 2209/40* (2013.01); *A23L 3/3409* (2013.01); *C02F 2103/02* (2013.01); *B01D 2311/06* (2013.01); *B01D 2315/20* (2013.01); *B01D 2321/04* (2013.01); *C02F 2303/16* (2013.01); *C02F 1/78* (2013.01); *C02F 2201/782* (2013.01); *C02F 2209/003* (2013.01); *C02F 1/727* (2013.01); *C02F 2209/006* (2013.01)
USPC .............. 210/639; 73/61.43; 210/85; 210/93; 210/96.2; 210/198.1; 210/199; 210/321.6; 210/650; 210/754; 210/758; 210/759; 210/760; 210/739

(58) Field of Classification Search
CPC .............. C02F 1/30; C02F 1/32; C02F 1/444; C02F 1/461; C02F 1/72; C02F 1/722; C02F 1/76; C02F 1/763; C02F 1/78; C02F 1/685; C02F 1/686; C02F 2201/78; C02F 2201/782; C02F 2209/003; C02F 2209/23; C02F 2209/235; C02F 2303/04; C02F 2209/40; B01D 17/12; B01D 61/14; B01D 61/16; B01D 61/22; B01D 63/00; B01D 63/06; B01D 65/02; B01D 65/10; B01D 2311/02; B01D 2311/04; B01D 2311/06; B01D 2311/12; B01D 2317/00; B01D 2317/04; B01D 2321/04; B01D 2321/40; B01D 2311/2692
USPC ............ 73/61.41, 61.43, 61.48, 61.59, 61.61, 73/863.01, 863.02, 863.71, 86, 5.9; 210/85, 87, 93, 94, 96.1, 96.2, 192, 210/198.1, 199, 321.6, 321.69, 321.87, 636, 210/639, 650, 739, 745, 746, 753, 754, 758, 210/760, 764, 755–757, 759; 422/22, 24, 422/28, 29, 82.01, 82.05, 400; 436/124, 436/125, 127, 135, 136
See application file for complete search history.

(56) References Cited

U.S. PATENT DOCUMENTS

| | | | |
|---|---|---|---|
| 5,607,593 A | 3/1997 | Cote et al. | |
| 6,464,877 B1 * | 10/2002 | Mori et al. | 210/639 |
| 6,755,977 B2 * | 6/2004 | Brunsell | 210/648 |
| 6,824,695 B2 * | 11/2004 | Tempest, Jr. | 210/760 |
| 7,632,410 B2 * | 12/2009 | Heiss | 210/637 |
| 8,486,275 B2 * | 7/2013 | Wolf | 210/748.19 |
| 2003/0116491 A1 | 6/2003 | Yamazaki et al. | |

| | | | |
|---|---|---|---|
| 2005/0139530 | A1 | 6/2005 | Heiss |
| 2010/0204924 | A1* | 8/2010 | Wolfe et al. .................... 702/25 |
| 2011/0186495 | A1* | 8/2011 | Robinson et al. .......... 210/198.1 |

FOREIGN PATENT DOCUMENTS

| | | | |
|---|---|---|---|
| DE | 69828821 | T2 | 11/2005 |
| DE | 69938566 | T2 | 6/2009 |
| EP | 1233932 | A1 | 8/2002 |
| FR | 2928366 | A1 | 9/2009 |
| JP | 2009178713 | A | 8/2009 |

OTHER PUBLICATIONS

Notification of Second Office Action, The State Intellectual Property Office of the People's Republic of China, Application No. 201110304063.2 dated Sep. 22, 2013.
Search Report for EP11178636.4 mailed Feb. 1, 2012.
Search report for DE 10 2010 041 827.7, dated Aug. 2, 2011.
Notification of Second Office Action, The State Intellectual Property Office of the People's Republic of China, Application No. 201110304063.2 dated Apr. 9, 2014.

* cited by examiner

*Primary Examiner* — Joseph Drodge
(74) *Attorney, Agent, or Firm* — Marshall, Gerstein & Borun LLP

(57) ABSTRACT

A method of producing sterile water from raw water during a production cycle in a production plant P, including adding a disinfectant to the produced sterile water during the production cycle to permanently monitor the condition of the sterile water and/or the production plant, and determining and evaluating a reduction of concentration of the disinfectant directly in the production stream. In a production plant suited for carrying out the method, a sterile sensor is provided directly in the production stream through which the reduction of concentration of the disinfectant added to the produced sterile water can be permanently measured and evaluated to provide a sterility evidence.

18 Claims, 1 Drawing Sheet

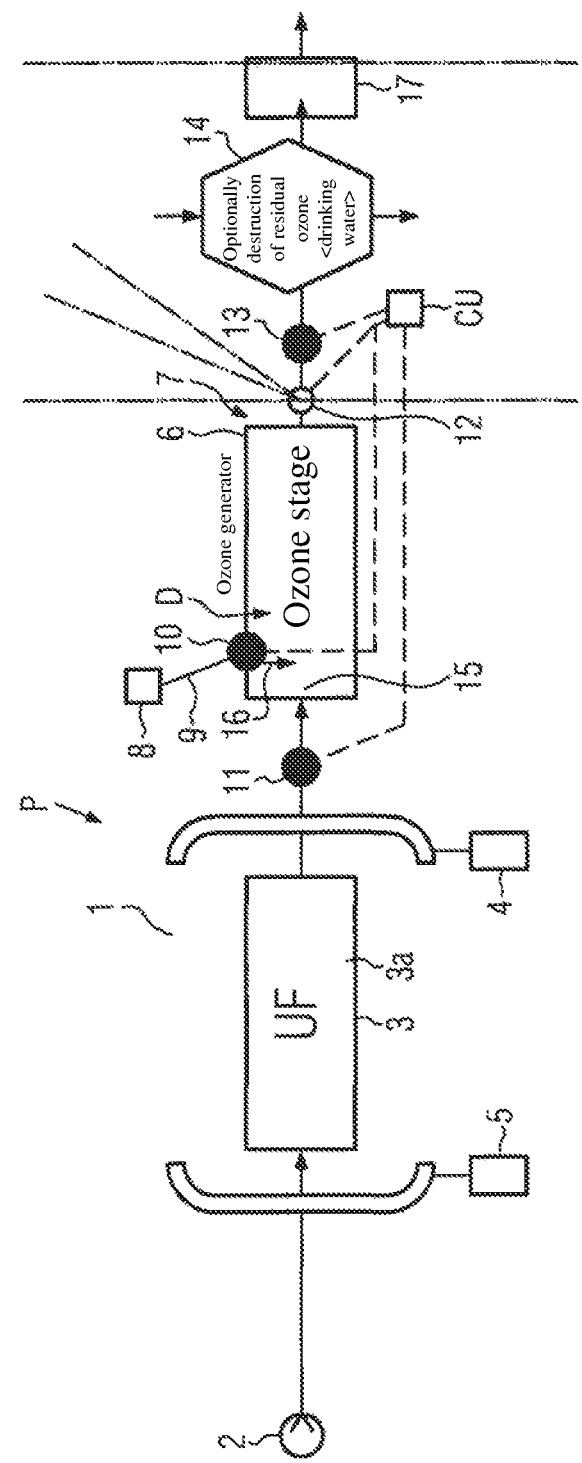

METHOD AND PRODUCTION PLANT FOR PRODUCING STERILE WATER

CROSS-REFERENCE TO RELATED APPLICATION

The present application claims the benefit of priority of German Application No. 102010041827.7, filed Sep. 30, 2010. The entire text of the priority application is incorporated herein by reference in its entirety.

FIELD OF THE DISCLOSURE

The disclosure relates to a method and to a production plant for producing sterile water, and of the type using a disinfectant.

Sterile water, in particular to be used in beverage production, in filling engineering, for cleaning plants or in packaging engineering, is usually produced in so-called UHT production plants by heating. The temperature control of the production plant permanently supplies an integrity evidence to be able to exclude that contaminated sterile water is released for use. However, UHT product plants are technically complicated and expensive, and their operation requires a very high amount of energy.

As an alternative to UHT technology, production plants operated without heating offer themselves, such as ultrafiltration plants with at least one membrane unit, wherein microorganisms and germs are discharged from the raw water by extremely small pores. Ultrafiltration requires regular backflush cycles for each membrane unit, wherein two subsequent backflush cycles each limit one production cycle in time. Though an integrity test is often carried out in connection with each backflush cycle which ensures that the membranes properly filter at the beginning of a production cycle, an element of uncertainty in view of sterility is given in that malfunctions occurring during the production cycle, such as a membrane fracture or the detachment of a nest of germs, are not detected and thus contaminated sterile water can be released for use.

From FR 2928366 A, a production plant for producing drinking water from contaminated water is known wherein the water is pumped through several parallel filter units, ozone as a disinfectant is added to the contaminated water in a reactor containing the filter units, and downstream of the filter units, the quality of the drinking water is checked with a quality sensor before it is released for use via two intermediate storages connected in series. In the first intermediate storage, drinking water for backflush cycles is held ready. The addition of ozone is changed according to the determined quality of the drinking water. Depending on the measuring result of the quality sensor, it is decided whether the drinking water will be subjected to subsequent treatment. Only the reactor contains sensors for determining the concentration of ozone.

From U.S. Pat. No. 5,607,593 A, a production plant for producing drinking water is known, wherein the raw water, e.g. river water, is pumped through membrane units, and ozone as a disinfectant is added in the membrane units. It is true that integrity tests are carried out after the production cycles of the membrane units. However, if a membrane fracture occurs during a production cycle of a membrane unit, or a nest of germs is dissolved, contaminated drinking water will be forwarded for use.

As in both afore-mentioned production plants, the disinfectant is pumped through the membrane units, membranes that are resistant to the disinfectant must be furthermore used.

SUMMARY OF THE DISCLOSURE

One aspect of the disclosure is to provide a method of the type mentioned in the beginning as well as a production plant for carrying the said method by means of which increased operational reliability is ensured to guarantee that sterile water forwarded for use is indeed sterile in a procedurally simple manner.

According to the method, the disinfectant is added only to the already produced sterile water, independent of whether the sterile water is indeed sterile (that means free of germs) or contaminated, and then the reduction of concentration of the disinfectant is directly detected and evaluated in the production stream. The at least one disinfectant is here not used for disinfecting the sterile water but to be able to find out, by the evaluation of the reduction of concentration in the production stream, whether the production plant works properly during a production cycle or whether there is a malfunction. With a proper function of the production plant, an exactly predeterminable, relatively small reduction of concentration of the disinfectant occurs, while in case of a malfunction, a considerably more significant reduction of concentration occurs due to contamination as a consequence of the destruction of microorganisms or germs by the disinfectant, so that then an immediate conclusion to a malfunction is possible and a counter-measure can be initiated.

This manner of carrying out the sterility evidence permanently by adding the disinfectant and determining and evaluating the reduction of concentration is especially suitable for ultrafiltration technology the essential advantage of which over UHT methods is that it is possible to produce sterile water with a high throughput and low energy demand, where the disadvantage of a not permanently provided sterility evidence during the production cycle, which had to be accepted up to now, is eliminated in a simple manner. However, the method is also suited for those production plants which are operated in a different way without heating to produce sterile water, because to provide the sterility evidence, one intervenes in the production stream not before sterile water is produced. Other technologies here can be membrane methods other than ultrafiltration (other pore sizes), but also other sterilization methods as an alternative to heating, such as high pressure, frequency methods, or else differing chemical methods and combinations thereof. Of course, the sterile sensor also works in any method operated by heat which can replace ultrafiltration, for example in microwaves or in high-frequency methods.

The production plant can be operated at a high throughput as the sterile sensor supplies a sterility evidence directly in the sterile water production stream and permanently by monitoring the reduction of concentration of the disinfectant introduced for the sterility evidence. If the production plant is in particular an ultrafiltration plant with at least one membrane unit (membrane filtration), the type of membrane used does not have to be resistant to the added disinfectant as it is added for permanent integrity control during each production cycle only in the product stream downstream of the membrane unit. For although an integrity test of a membrane unit is carried out before each production cycle, as is conventional, the risk of a malfunction during the production cycle nevertheless remains and can lead to contamination, so that contaminated sterile water would be released for use. The sterile sensor, however, provides the sterility evidence during the production cycle and at least to the next integrity test of the membrane unit, so that in a malfunction, immediate counter-measures can be initiated, i.e. the production plant is, for example, shut down, or a defective membrane unit is isolated, or the product stream is blocked towards use or diverted or discarded. Instead of ultrafiltration technology, another technology by which sterile water can be produced can also be employed, for the sterile sensor is only active in the product stream, independent of the employed technology, to monitor and confirm the proper operation of the production plant.

According to the method, ozone as the disinfectant is particularly suitably added to the produced sterile water because the reduction of concentration of ozone can be precisely measured, and ozone does not represent any critical pollution in water and decomposes or is easily removable anyway. However, other disinfectants, as for example chlorine dioxide, hydrogen peroxide or singlet oxygen and others are also useful. Optionally, combinations of disinfectants are even added.

The monitoring at least of the operativeness of the production plant is suitably effected according to the method with a sterile sensor directly arranged in the product stream downstream of the product plant which determines sterility online and which precisely detects the reduction of concentration of the disinfectant in the product stream, and e.g. responds in case of a significant reduction of concentration as a reaction to a malfunction in an easily evaluable manner.

According to the method, the sterile water mixed with the disinfectant is furthermore suitably guided through a residence time section, and the concentrations of disinfectant before and after the residence time section are measured. The residence time section leads to an informative reduction of concentration which can be reliably measured. For example, the sterile sensor only responds to a significant reduction of concentration (e.g. when a threshold value is reached), so that production can be permanently continued when the sterile sensor does not respond. Production can be immediately interrupted, or a counter-measure can be initiated, when the sterility evidence cannot be provided by the sterile sensor. The response of the sterile sensor can, as an alternative, even be used to increase the added concentration until the sterile sensor can provide the sterility evidence, as then the disinfecting effect of the disinfectant, at least in case of a minor malfunction in the production plant, finally guarantees the sterility of the sterile water and so to speak compensates the malfunction. Thus, production can be continued, e.g. at least to the next integrity test.

According to the method, as a measured value in the product stream, the half-life reduction of the concentration of disinfectant, e.g. ozone, is particularly suitably evaluated because this half-life reduction does not only supply a very precise measuring result, but can also be easily measured.

To be able to provide the sterility evidence with high reliability, not only the concentrations of disinfectant after or at the addition, and the concentration of disinfectant after the residence time section are suitably measured and evaluated, but e.g. the original condition of the produced sterile water before the addition of the disinfectant is also measured and evaluated, and the product stream, i.e. the flow rate, is also measured to be able to carry out the method in a validated and/or calibrated manner, e.g. despite production fluctuations.

The concentration of disinfectant can be relatively low to be able to reliably provide the sterility evidence. This means that the disinfectant, e.g. ozone, can optionally remain in the sterile water because it either decomposes anyway, or because it does not present any disadvantages or falls below legal limiting values. However, according to the method, it is also possible to destroy disinfectant residues or at least largely remove them before the product stream is released for use.

If ozone is used as the disinfectant, it can be generated by means of an ozone generator, or originate from another ozone source. Suitably, ozone is generated inline or in a bypass flow or in a circular flow by means of an ozone generator which generates ozone with electrodes in the sterile water from the water molecules, or from air or oxygen, e.g. by ultraviolet light or corona discharge.

To be able to further operate the production plant after an only small damage or a minor malfunction has occurred and been detected, e.g. at least to the next integrity test of a membrane unit, the added concentration of the disinfectant can be adapted to requirements arising due to a no longer sufficient sterility of the production plant in sensibility stages. This can preferably be effected to compensate the no longer sufficient sterility of the production plant by adding the disinfectant corresponding to a validation protocol set up via the sterile sensor. In this case, the disinfectant is not only added to permanently provide the sterility evidence, but also to kill microorganisms or germs to a restricted degree ("suspenders function"). The equipment with the sterile sensor and the disinfectant adding device primarily for permanently providing the sterility evidence is as such also useful for this additional function, optionally after slight modifications.

In the production plant, a residence time section is provided for the product stream which ensures that the added disinfectant must remain in the product stream for quite some time. In the region of the start of the residence time section, an adding device for the disinfectant is provided. The sterile sensor comprises, downstream of the residence time section, a disinfectant final concentration sensor and preferably upstream of the residence time section, a sensor for detecting the original condition of the produced sterile water, and/or a volume flow rate measuring device for the production stream. The volume flow rate measuring device is, for example, placed upstream of the disinfectant final concentration sensor. This sensor combination and also the volume flow rate measuring device permit a precise calibration of the sterile sensor, for example if the product stream varies.

For the respective added concentration to be known and to be taken into consideration in the measurement, either the adding device is embodied as controlled dosing device which introduces a precisely determinable and thus known concentration, or in the region of the start of the residence time section and downstream of the adding device, a disinfectant initial concentration sensor is provided whose measuring result can serve as a reference to the disinfectant final concentration sensor.

The sterile sensor provided in the product stream of the production plant suitably measures as measured value the half-life reduction of the concentration of disinfectant. The sterile sensor ensures long services lives and a high measurement certainty if the respective disinfectant concentration sensor, preferably in case of ozone as added disinfectant, is embodied corresponding to a principle of measurement of an electrochemical reaction, wherein electric current or electric voltage is applied, e.g. by a membrane where an electrolyte and a pair of electrodes are arranged at the side of it that is not exposed to the current or voltage. As an alternative to this, an inline ultraviolet process photometer could also be used, by means of which the characteristic wavelength of dissolved ozone and/or its intensity can be precisely measured as a measurand.

The adding device can comprise an ozone generator operated with electrodes either directly inline or in a bypass flow or in a circular flow, either with water molecule electrodes or via air or oxygen-ultraviolet or corona discharge. For adding the generated ozone, or else for another disinfectant, a t-piece coupling or a venturi tube injector or a probe can intervene in the product stream to introduce ozone in a distribution as uniform as possible.

The provided residence time section can be a pipe section with a defined pipe cross-section. This pipe cross-section can preferably be embodied with defined, determined mixing phases. The pipe cross-section is suitably larger than the pipe cross-sections in further production stream pipelines of the production plant. In contrast, preferably at least at the measuring site of each disinfectant concentration sensor, one predetermined representative cross-section can be selected each which is smaller than the pipe cross-section in the pipe section.

Provided that the production plant is an ultrafiltration plant with at least one membrane unit, the membrane unit comprises an integrity test device by means of which an integrity test is performed during an interruption of operation before and after each production cycle of this membrane unit, optionally in connection with a backflush cycle carried out with a provided backflush system, said integrity test confirming whether the membrane unit is operational at the beginning of the following production cycle or not. It is determined at the latest in this integrity test whether the membrane unit is still operational at present. If there had been a malfunction in the membrane unit already before, this was already detected before by the sterile sensor, and a counter-measure was initiated. For this reason, the sterile sensor should be operable during each production cycle at least downstream of one or several membrane units operated in parallel. Of course, a permanent operation of the sterile sensor is also possible. Then, optionally at least sometimes, integrity tests and their time required could be omitted or saved. Optionally, an interruption of the operation is utilized for an integrity test to update the sterile sensor or calibrate it again.

To meet particularly high sterility demands, it can be furthermore suitable to embody at least the respective disinfectant concentration sensor to be redundant, i.e. either in a double and switchable or in a self-testing manner, or to redundantly provide at least two sensors each between which one switches if a malfunction occurs in one of them.

A computerized controlling system is suitably associated to the production plant and carries out measurements and generates the corresponding operational commands or acoustically or optically emits alarm signals, suitably notes down a protocol from which one can determine, for example in an ultrafiltration plant, the necessity of general cleaning, and which can evaluate other failures as to their frequency, e.g. with respect to product plant modifications.

BRIEF DESCRIPTION OF THE DRAWINGS

With reference to the drawing, an embodiment of a production plant for producing sterile water as well as a production process are described.

The FIGURE is a schematic representation of a production plant.

DETAILED DESCRIPTION OF THE PREFERRED EMBODIMENT

The FIGURE schematically illustrates a production plant P operated in this embodiment without heating for producing sterile water. Sterile water here means actually sterile water, as it is consumed, for example, in the beverage industry for the production of beverages, in filling, in cleaning, or in the packaging industry in processes, but it also means drinking water, table water or the like, i.e. pure water in a wider sense produced from raw water by a purification process. In general, in sterile water production, the permanent assessment of the sterile condition or the proper function of the production plant P plays an important role, for example for an aseptic filling process in beverage industry, where, for example, sterile water is constantly required in a rinser. Among other things, it is about production rates of, for example, 5 to 15 $m^3/h$ and flow rates of about 1.0 m/s.

As an alternative to the mainly energy-consuming UHT production process in production plants with the application of heat, alternative production plants for sterile water are increasingly taken into consideration. For this, sterile filters are often employed, i.e. membrane filter units with membranes with pore sizes of about 0.2 to 0.45 μm, or even with pore sizes of only about 0.02 μm, depending on the field of application of the sterile water and the finally required germ reduction. As germs possible in the field of beverages have sizes of about 0.5 μm to 1.0 μm, membranes with pore sizes of about 0.2 μm are usually sufficient. Statistically, the production with pore sizes of about 0.02 μm are, however, more secure. As an alternative, such operated production plants P for sterile water can also utilize other technologies than the ultrafiltration technology, for example also the UHT technology.

In case of ultrafiltration technology, the employed membranes can be embodied as hollow fibers, plates or coiled membranes. The membrane materials can comprise different plastics, such as for example polyethersulfone, or ceramics, sintered metals, etc. In ultrafiltration technology, the correct operating state of the production plant or the membranes, respectively, is conventionally checked by the so-called integrity test before, and if desired also after a production cycle. In the process, the air permeability of the wetted membrane is determined by means of compressed air, e.g. sterile air, in a fixed pressure range according to the "bubble-point" test principle. The monitored adjusting pressure difference (transmembrane pressure) and its reduction over a fixed characteristic time interval is an informative indication for the integrity with the respectively present pore size of the wetted membrane. This test reacts very sensibly to defective membranes (membrane fracture). The integrity test requires uncoupling the respective membrane unit to be subjected to the integrity test in case of several membrane units working in parallel. If the integrity test is not passed, the membrane unit for example remains uncoupled. The integrity test can only be carried out during a production standstill (standstill of the membrane unit), in most cases in connection with a preceding backflush cycle and/or a cleaning cycle or sterilization cycle. A production cycle then lasts until the next integrity test. Only then, the proper condition can be checked again. This means that during the production cycle, there is no possibility of detecting a malfunction arising after the last integrity test and to remove it or initiate a counter-measure. In other words, the production cycle has been operated up to now relying on the assumption that not damage occurs during the production cycle. If, however, damage occurs, the produced sterile water is contaminated, and the product volumes of membrane units working in parallel are possibly also contaminated, and the contaminated sterile water has already come into use when a malfunction is detected in the next integrity test of the malfunctioning membrane unit. Contaminated sterile water that has come into use, however, involves extremely high consequential costs and counter-measures. Insofar, the advantage of a production plant operated without heating for the production of sterile water always involves the risk that due to a damage occurring in the respective production cycle, contaminated sterile water can come into use.

According to the disclosure, this disadvantage is eliminated by at least one sterile sensor 7 of the production plant P which automatically monitors the sterility directly in the product stream at least during each production cycle and provides a sterility evidence, so that, when a malfunction occurs which involves contamination, counter-measures can be immediately initiated. The sterile sensor 7 here measures a reduction of concentration of a disinfectant D added to the sterile water product stream for the sterility evidence. The disinfectant D is, for example, ozone, although chlorine dioxide, hydrogen peroxide, singlet oxygen or similar disinfectants could also be used individually or in combination. Here, the purpose of the disinfectant D is not, as in the common water purification technology, to produce sterility by killing microorganisms or germs, but to create a possibility of an online condition control of the produced sterile water and/or the production plant during a production cycle. Here, in case of ultrafiltration technology, the sterile sensor 7 can be arranged downstream of one membrane unit each, or in the production stream of several membrane units operated in parallel.

In FIG. 1, the production plant P is equipped with a hygienic, sanitizing module 1, e.g. with an ultrafiltration module 3 with at least one membrane unit 3a which is supplied with raw water via a pump 2 and supplies sterile water in a product stream 15. A backflush system 5 and an integrity test device 4 can be associated to the module 1 or 3, respectively. An integrity test is often carried out such that sterile air is directed from behind the membrane to the membrane and maintained. Only in case of a defect, the air would reach the other side of the membrane. The backflush system 5, optionally with a pump and a reservoir, and the integrity test device 4 are used before and after each production cycle, for example to backflush the membrane and then check and confirm its integrity, for example by means of the bubble-point test. At least during the production cycle, the sterile sensor 7 optionally performs a validation and calibration measurement by measuring, monitoring and evaluating the reduction of concentration of the added disinfectant D, which will become significantly more pronounced in case of a contamination than in sterile water of perfect quality.

Although the disinfectant D is primarily added for condition control, and its reduction of concentration is measured, the disinfecting effect of the added disinfectant can be additionally utilized to continue the production cycle in case of an only minimal contamination in the product stream, for example if a minor error has occurred at an individual membrane, or only possibly existing weak growth has been entrained. The disinfection effect of the disinfectant D compensates this minor pollution, while the production of sterile water without pollution is continued. This slight malfunction can be eliminated at the next integrity test, or the production plant P can be still operated as long as the required sterility can be ensured by means of the added disinfectant. In the process, the addition can be optionally increased. Thus, by exactly dosing the disinfectant, the exactly germ-free condition, but also a condition of minimal pollution can be adjusted. The primary purpose of the addition of disinfectant and the function of the sterile sensor 7, however, is to permanently monitor the condition during the production cycles.

In FIG. 1, the product stream 15 from module 1 or 3, respectively, is guided through a residence time section 6 in the region of which the sterile sensor 7 is placed. In the shown embodiment, in the region of the start of the residence time section 6, an adding device 9 for the disinfectant D into the product stream 15 is provided, for example in case of ozone, an ozone generator 8 which adds the generated disinfectant D to the product stream 15 with a certain concentration, for example, via means 16, such as a t-piece, a venturi tube injector, or a probe or the like. In case of ozone as the added disinfectant D, a concentration of about 0.5 to 1.0 ppm can be, for example, sufficient, the residence time section 6 being embodied such that it defines a time window of, for example, 120 s for the production stream. After this period, the added disinfectant D in the product stream 15 reaches a disinfectant final concentration sensor 13, which should have, for example, a sensitivity of at least 0.01 ppm to about 2.0 ppm. The adding device 9 can be embodied as dosing device which introduces an exactly determined concentration of the disinfectant. In addition or as an alternative, a disinfectant initial concentration sensor 10 which checks or measures the introduced concentration, and a reference for the final concentration sensor 13 can be employed in this region. The measured values of the sensors 10, 13 are evaluated to detect the reduction of concentration (concentration difference measurement).

The residence time section 6 can be embodied e.g. as a pipe section or flow section with a defined pipe cross-section and contain defined determinable mixing phases. If these mixing phases are sufficiently determined, the residence time section 6 can also have a larger cross-section than other product pipelines of the production plant P. It is, however, important that at the respective measuring sites at least of the sensors, e.g. 10, 13, a representative cross-section for the respective sensor is observed. This means that a length of pipe provided in the region of the respective sensor can comprise a smaller cross-section than the pipe cross-section in the residence time section 6. Here, it is important that the sensors 10, 13 are not positioned in a bypass line, but directly in the product stream 15.

In addition, the sterile sensor 7 comprises, in a suitable embodiment, a sensor 11, for example upstream of the residence time section 6, for determining the sterile water's original condition, and a volume flow rate measuring device 12, for example in the region of the end of the residence time section 6. Following the sterile sensor 7 there is/are furthermore provided means 14 for destroying disinfectant residues and/or an intermediate storage 17, which intermediately stores at least the production volume that has been produced at least during the response time of the sterile sensor 7, before it is released for use. For in case of ozone as the disinfectant D, for example, the employed sensors 10, 13 usually have a response time of about 30 to 60 s, so that an informative result is present only after this response time.

The residence time section 6 could moreover also be a container.

The ozone generator 8 generates ozone directly from the water molecules by electrolysis, or from air or oxygen, for example by means of ultraviolet light or corona discharge. The concentration difference measurement should be carried out in the product stream 15 because a measurement in a bypass would, for example, even lead to a logarithmic error. The sensors, i.e. at least sensors 10, 13, can be equipped or embodied to be redundant, and their measured values can be capable of being plotted, so that the production plant P is also FDA-compliant.

At least the initial and final concentration sensors 10, 13, for example in case of ozone as the disinfectant D, are based on a measuring principle which utilizes an electrochemical reaction in which current is supplied through a membrane and an electrolyte and a pair of electrodes is located behind the membrane. Moreover, inline ultraviolet process photometers can be used as the sensors 10, 13. They operate on the basis of absorption. The characteristic wavelength of dissolved ozone and its intensity are measured as characteristic measurand for the ozone concentration.

Also by using the measuring results of the further sensors 11, 10 and the volume flow rate measuring device 12, among other things, a constant reduction of concentration of the disinfectant results in the calibrated original condition of the sterile sensor 7. This reduction is always present in the product stream 15, in particular in case of ozone, and largely constant with a constant raw water quality and a perfect operativeness of the production plant. In case of a rough contamination, the decomposition of the disinfectant D is increased, i.e. the half-life period in the decomposition of the ozone concentration is reduced. The sterile sensor 7 responds to it and, for example, emits an alarm or causes the abortion of the production cycle or the rejection of the produced sterile water. This is because a rough change means a significant membrane fracture or module error, or else a detachment of a nest of microorganisms or germs up to then not detectable and requires immediate counter-measures. As mentioned, a minimum contamination can be compensated at least for some time by the addition or increased addition of the disinfectant.

In case of ozone as the disinfectant, it decomposes according to its half-life period, or it is destroyed and removed in the means 14, so that no ozone residues remain in the sterile water.

Basically, the sterile sensor 7 is operated on the basis of a measurement of the half-life reduction of concentration of the added disinfectant D. Supported by the further components (11, 10 and 12), the sterile sensor 7 can perform a validation and calibration measurement permitting an extremely informative assessment of the condition of the produced sterile water and/or the production plant P in the running production cycle. The determination of the half-life period only exhibits very minimal variations and no significant variations. However, for properly monitoring the condition of the running production cycle, this is not bad as the condition of the membrane unit 3a has already been detected as intact before the beginning of the production cycle in the carried out integrity test. Accordingly, only the production volume of sterile water during the production cycle to the next backflush cycle or integrity test has to be ensured. The next integrity test assesses and confirms the condition of the membrane's operativeness again, whereupon new measures can be initiated.

The invention claimed is:

1. Method of producing a product stream of sterile water from raw water during a production cycle by ultrafiltration in at least one membrane unit in a production plant, the method comprising:
    continuously adding a disinfectant to the product stream of the sterile water downstream of the at least one membrane unit during the production cycle to determine whether the production plant is working properly during the production cycle, the continuously adding comprising adding, at a region of a beginning of a residence time section provided in the product stream, a known concentration of the disinfectant to the product stream;
    measuring a reduction of concentration of the disinfectant in the product stream between a first position downstream of the residence time section and one or more second positions downstream of the membrane unit and upstream of the residence time section and/or in a beginning portion of the residence time section;
    evaluating the known concentration of the disinfectant and the measured concentration of the disinfectant to permanently detect a concentration difference measurement indicative of the concentration reduction of the added disinfectant; and
    determining, based on the concentration difference measurement, whether the production plant is working properly during the production cycle, wherein the determining comprises determining that the production plant is working properly during the production cycle when the detected concentration difference measurement is less than or equal to a predetermined concentration difference measurement representative of a predetermined sterility of the product stream, and wherein the determining comprises determining that the production plant is not working properly during the production cycle when the detected concentration difference measurement exceeds the predetermined concentration difference measurement.

2. The method according to claim 1, wherein continuously adding the disinfectant comprises adding ozone, chlorine dioxide, hydrogen peroxide, singlet oxygen, or a combination thereof.

3. The method according to claim 1, wherein the measuring and the evaluating are carried out, during the production cycle, with a sterile sensor that is arranged downstream of the at least one membrane unit of the product plant in the product stream.

4. The method according to claim 1, further comprising:
    continuing the production cycle when it is determined that the production plant is working properly during the production cycle and when it is determined that the production plant is not working properly during the production cycle;
    increasing the known concentration of the disinfectant added to the product stream when the detected concentration difference measurement exceeds the predetermined concentration difference measurement, the increasing performed until the detected concentration measurement difference is less than or equal to the predetermined concentration difference measurement; and
    cancelling the production cycle when the known concentration of the disinfectant added to the product stream cannot be increased such that the detected concentration measurement difference is less than or equal to the predetermined concentration difference measurement.

5. The method according to claim 4, wherein the increasing comprises increasing the known concentration of the disinfectant in stages.

6. The method according to claim 1, wherein the evaluating comprises evaluating a half-life reduction of the disinfectant in the product stream.

7. The method according to claim 1, further comprising removing disinfectant residues before the product stream is released for use, the removing performed until a level of the disinfectant residues falls below a limiting value.

8. The method according to claim 1, wherein the adding comprises adding ozone one of inline, in a bypass flow, and in a circular flow.

9. The method according to claim 1, further comprising cancelling the production cycle when it is determined that the production plant is not working properly during the production cycle.

10. Production plant for producing a product stream of sterile water, the production plant comprising:

at least one ultrafiltration membrane unit;

a residence time section for the product stream, the residence time section being downstream of the at least one ultrafiltration membrane unit;

a disinfectant adding device for continuously adding a known concentration of at least one disinfectant to the product stream in a region of a beginning of the residence time section;

a sterile sensor for permanently measuring a concentration of the disinfectant in the product stream at a position downstream of the residence time section, the sterile sensor configured to evaluate the known concentration of the at least one disinfectant added to the product stream and the measured concentration of the disinfectant to permanently detect a concentration difference measurement indicative of a concentration reduction of the added disinfectant, and the sterile sensor further configured to determine, based on the concentration difference measurement, whether the production plant is working properly during the production cycle, wherein the production plant is working properly during the production cycle when the detected concentration difference measurement is less than or equal to a predetermined concentration difference measurement representative of a predetermined sterility of the product stream, and wherein the production plant is not working properly during the production cycle when the detected concentration difference measurement exceeds the predetermined concentration difference measurement, the sterile sensor comprising a first component downstream of the residence time section and one or more second components downstream of the at least one ultrafiltration membrane unit and upstream of the residence time section and/or in a beginning portion of the residence time section.

11. The production plant according to claim 10, wherein the sterile sensor comprises a disinfectant final concentration sensor downstream of the residence time section, and wherein the disinfectant adding device comprises a disinfectant dosing device configured to produce the known concentration of the at least one disinfectant or the sterile sensor comprises a disinfectant initial concentration sensor in the region of the beginning of the residence time section configured to measure an initial concentration of the at least one disinfectant added to the product stream, the known concentration being the initial concentration.

12. The production plant according to claim 11, further comprising a volume flow rate measuring device placed upstream of the disinfectant final concentration sensor.

13. The production plant according to claim 11, wherein the disinfectant final concentration sensor and the disinfectant initial concentration sensor are each operable (i) utilizing a measuring principle of an electrochemical reaction through a membrane with an electrolyte and a pair of electrodes at one side of the membrane, or (ii) as an inline UV process photometer.

14. The production plant according to claim 11, wherein the adding device comprises an ozone generator.

15. The production plant according to claim 11, wherein the residence time section comprises a pipe section with a defined pipe cross-section that is larger than cross-sections of other product stream pipelines of the production plant.

16. The production plant according to claim 15, wherein the pipe section of the residence time section is larger than a cross-section of a pipe section of at least each of the disinfectant final concentration sensor and the disinfectant initial concentration sensor.

17. The production plant according to claim 10, further comprising a sensor for detecting an original condition of the sterile water in the product stream, the sensor disposed upstream of the residence time section and upstream of the disinfectant adding device.

18. The production plant according to claim 10, wherein the sterile sensor is disposed directly in the product stream.

* * * * *